United States Patent [19]

Haynes

[11] 4,054,926
[45] Oct. 18, 1977

[54] DEVICE FOR AUTOMATIC PROGRAM SELECTION ON PRERECORDED MAGNETIC TAPE

[75] Inventor: Paul Jeffries Haynes, St. Louis, Mo.

[73] Assignee: Paul Jeffries Haynes, St. Louis, Mo.

[21] Appl. No.: 657,231

[22] Filed: Feb. 11, 1976

[51] Int. Cl.² .................... G11B 17/00; G11B 15/18
[52] U.S. Cl. ............................................ 360/72; 360/61
[58] Field of Search ........................... 360/61, 63, 72

[56] References Cited

U.S. PATENT DOCUMENTS

| 2,900,132 | 8/1959 | Burns | 360/72 |
| 2,926,298 | 2/1960 | Newhouse | 360/63 |
| 2,940,065 | 6/1960 | Formby | 360/72 |
| 3,051,777 | 8/1962 | Lemelson | 360/72 |
| 3,315,041 | 4/1967 | Sampson | 360/63 |

Primary Examiner—Jay P. Lucas
Attorney, Agent, or Firm—Veo Peoples, Jr.

[57] ABSTRACT

The present invention relates to a device for choosing any one or more selections on a prerecorded magnetic tape and having them played automatically in any sequence.

1 Claim, 11 Drawing Figures

DEVICE FOR AUTOMATIC PROGRAM SELECTION ON PRERECORDED MAGNETIC TAPE

BACKGROUND OF THE INVENTION

Although sound-recording and playing of commercially prerecorded tapes have become quite popular in recent years, there are several drawbacks with this type of entertainment. Normally, prerecorded tapes are in three forms, i.e., casette type, 8-track and reel-to-reel. The primary drawback of playing such tapes is that the listener is compelled to listen to the entire recorded program in the same sequence in which it has been recorded, or must manually adjust the rewind and fast-forward mechanism to play a particular selection.

Prior to the present invention it was believed that other methods to automatically accomplish these functions would be too complex, inaccurate and too slow to be feasible.

A practical, accurate, and quick response device which would allow a listener to select any one tune on a program or to play several tunes out-of-sequence by merely pushing a button would be a substantial and surprising advancement in the art.

SUMMARY OF THE INVENTION

The present invention relates to a method of manufacturing magnetic tape and a device for picking up signals from the specially manufactured tape such that individual selections on a program may randomly be picked and played by merely pushing a button, thus avoiding the manual adjustment of fast forward and reverse or rewind. Additionally, the device permits playing several selections on a pre-programmed tape in a sequence other than the original program sequence.

The method of tape-programming involves placing strips of metallic sensing tape onto the magnetic recording tape at the beginning and the end of each recorded tune on the tape.

The device for selecting and playing the tunes involves an electrical or electronic circuit with several subcircuits, i.e., the sensing and triggering circuit, selecting and scanning circuit, the logic circuit and a memory circuit. Generally, the sensing and triggering circuit serves to pick up an electrical signal from the metallic strips and activates the scanning and logic circuits. The scanning circuit serves the function of searching for the desired tune and automatically overlooking tunes which have not been selected. The logic circuit operates to automatically perform the functions of stopping, playing, fast forward and fast or reverse which were performed manually prior to the present invention. The memory circuit serves to store and automatically trigger a reverse or fast rewind response at any position on the tape.

DESCRIPTION OF THE PREFERRED EMBODIMENTS AND DRAWINGS

The functional elements of the circuitry will be described, for purposes of illustration, with electrical relays. However, these functions could also be accomplished equivalently with electronic tubes, and solid state elements such as transistors, flip flop and integrated circuits, etc.

Figure 1A:
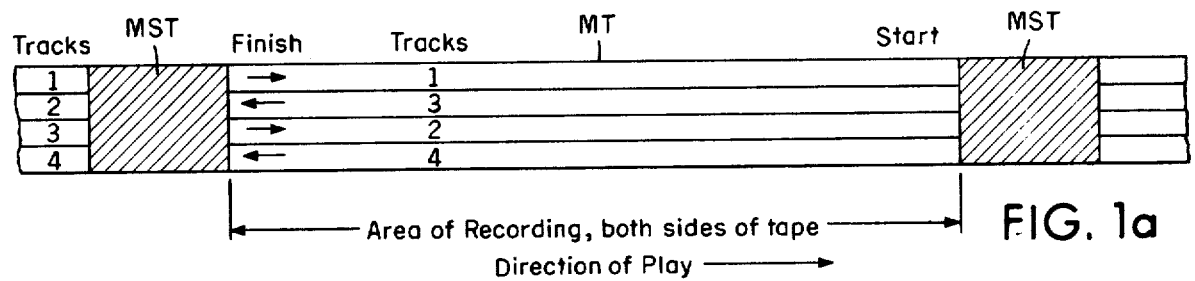
Figure 1B:
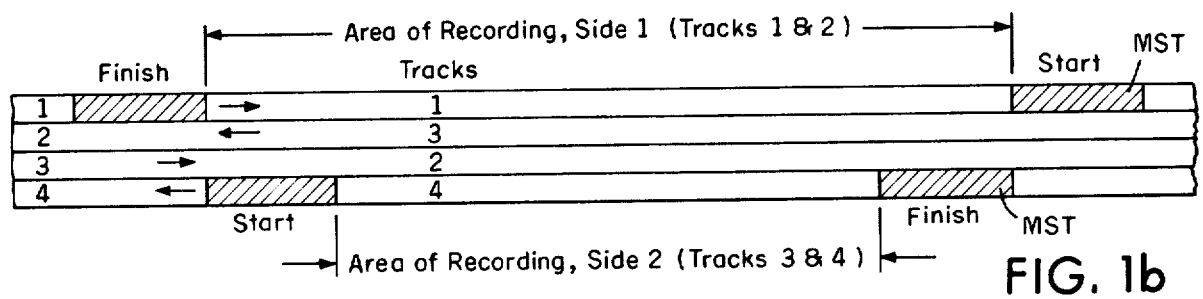
Figure 1C:
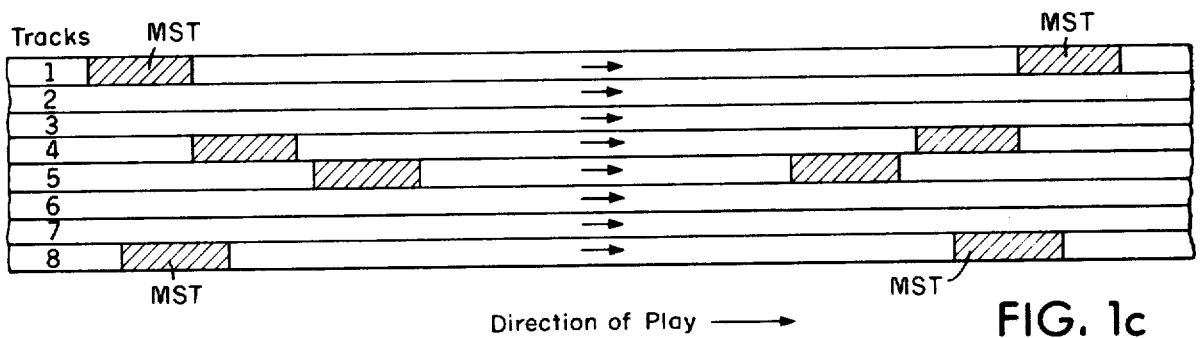

FIGS. 1a, 1b and 1c describe four and eight track tape configurations according to the present invention.

Figure 2A:
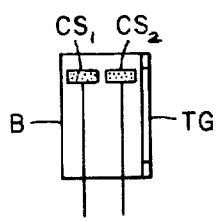
Figure 2B:
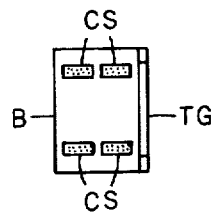
Figure 2C:
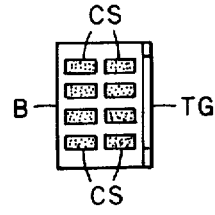
Figure 2D:
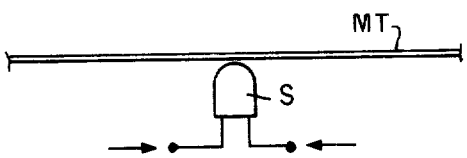
Figure 2E:
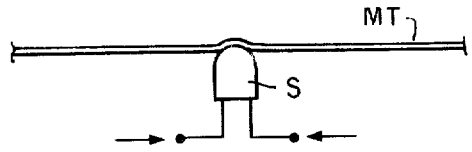
Figure 2F:
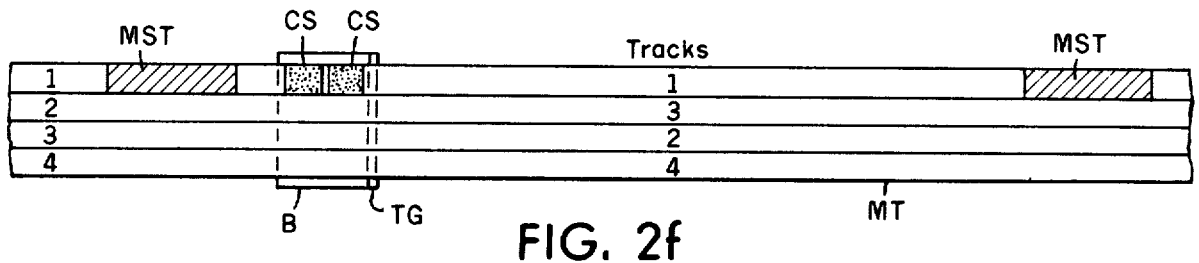

FIGS. 2a through 2e describe the configuration of sensors designed to respond to metallic sensing tape, and FIG. 2f shows this sensor aligned with a recording tape.

Figure 3A:
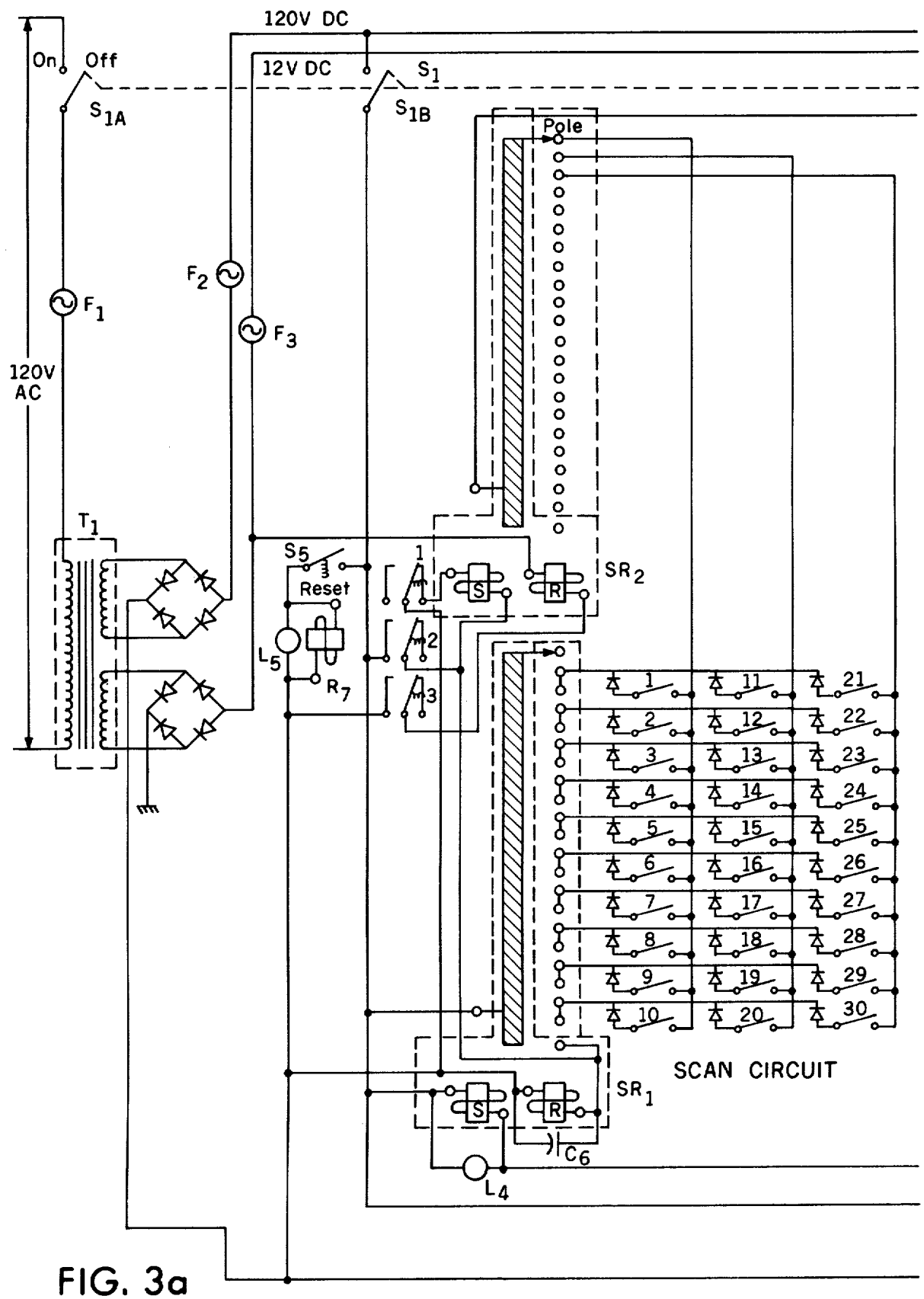
Figure 3B:
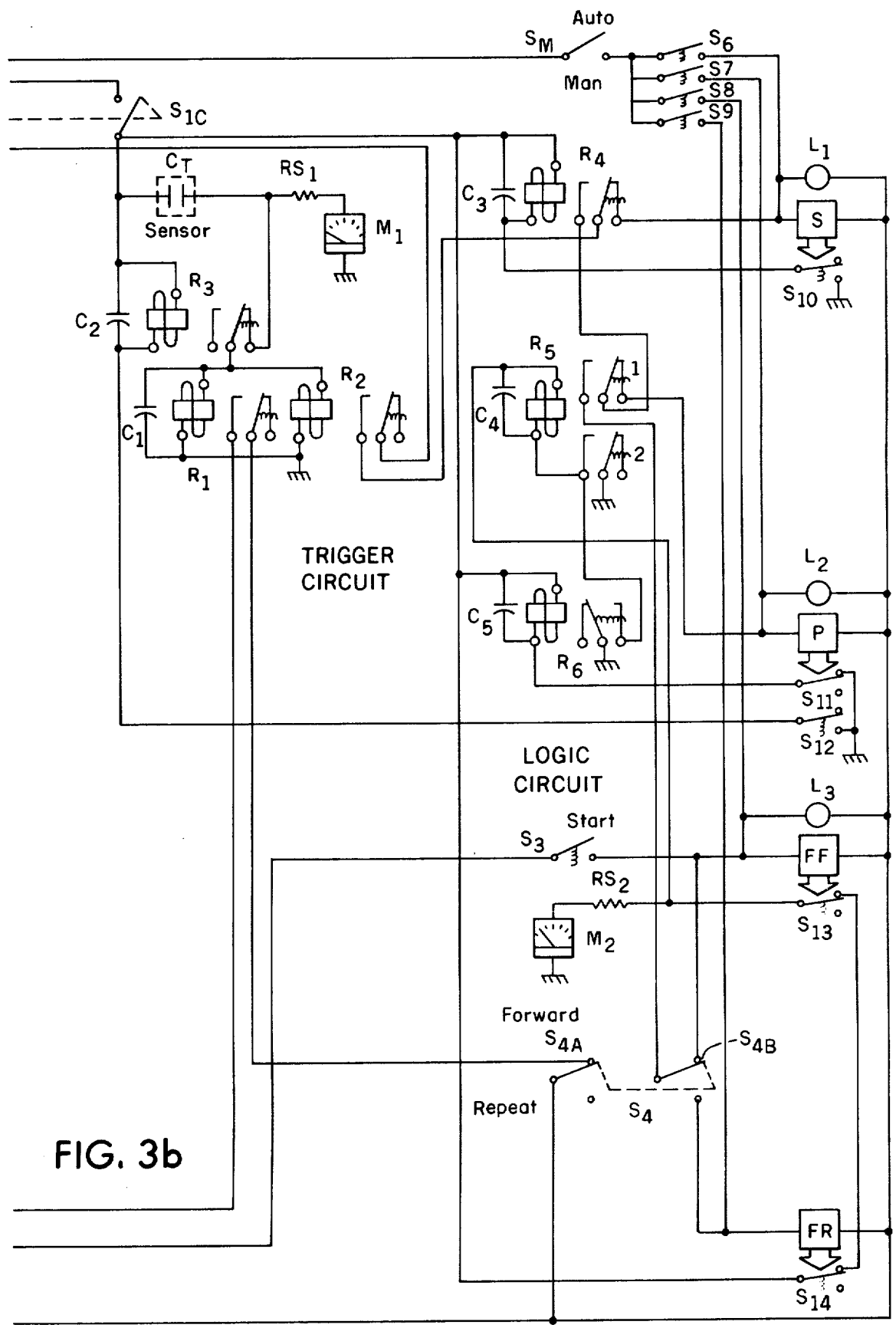

FIGS. 3a and 3b describe a sensing circuit in accordance with the invention.

TAPE PROGRAMMING

The magnetic tapes are recording tapes of the type coated with ferric oxide, etc. At the beginning and end of each tune a strip of metallic sensing tape or a printed conducting surface is placed on the recording tape. The strip should be long enough to allow the sensor to pick up a signal from the tape. About 2 inches is sufficient. A gap (unrecorded and with no sensing tape) is left on the magnetic recording tape between each tune or selection. The gap is large enough to permit Relay R5 to be reset by S13 or S14. It is preferred that the gap be from 12 to 18 inches long, depending on the speed of the FF and FR tape control. The metallic sensing tape or printed contact may be placed across the entire width of the recording tape if the tunes on each selection of each track that are separated by the metallic tape strips are of similar length (See FIG. 1a). Alternatively, the metallic tape may be placed with separate strips on each track. This is the preferred method because it minimizes interference during sensing. Plus, it allows each track to be recorded without regard to the length of time of the particular selection. (See FIG. 1b and 1c). FIG. 1a and 1b indicate that the tape may be flipped over (as with casette cartridges) but FIG. 1c shows that the tape is not flipped over (as with 8-track cartridges). The eight track tape must have separate strips of metallic tape for each track beacuse of its unique construction (FIG. 1c).

TAPE SENSING AND TRIGGERING

After the tape has been programmed and inserted into a tape player, the device of the present invention may be used.

The first step or element of this invention is the sensor (FIG. 2a) which is used to detect and transmit an electrical signal from the strips of sensing tape. The sensor is composed of two conducting surfaces (CS) which extend outwardly and a base (B). It is positioned so that the conducting surfaces may contact the tape when the sensor is activated. See FIGS. 2e and 2f. The sensor is solenoid activated much like the head of a tape player. That is, a button may be pushed to energize a solenoid which moves from the open position (FIG. 2d) to the closed position (FIG. 2e). Nevertheless, it functions quite differently from a tape head because the head merely records or picks up magnetic signals such as music, etc., whereas the sensor functions to detect the strips of sensing tape and trigger the trigger circuit. When the sensor is in contact with the tape then, as the strip of sensing tape crosses the two conducting surfaces, an electrical current flows through surface 1 into the remainder of the circuitry and back out of surface 2, thus the surfaces in conjunction with the sensing tape serve as a switch to close the overall circuit and activate the device.

Upon activation current flows first to the triggering circuit (FIG. 3 marked triggering circuit). Relays R1 and R2 are connected in parallel and are activated by a sensor each time a strip of sensing tape crosses it. When the normally open contacts of R1 closes, the scan circuit (schematic marked scan circuit) will operate. When the normally open contacts of R2 close, the logic circuit (schematic marked logic circuit) will operate. Relay R3 is connected so that when the play mode starts, its normally closed contacts will open the sensor circuit. Opening of the sensor circuit in this manner eliminates residual signals from haphazardly activating the triggering circuit which, if permitted, would interfere with scanning or the selection of the particular tune which is desired.

SELECTING AND SCANNING

Any one tune, combination of tunes, or all tunes may be selected and played automatically by pushing a button to activate the various selection switches (marked 1 through 30 on the schematic diagram). These switches are connected in (series) with the contacts of the two stepping relays in the scan circuit. This allows the switches, when closed, to create individual circuits which can activate the logic circuit (discussed later) when the poles of SR1 and SR2 reaches it. The process of finding the closed switches is called scanning.

Each of the two stepping relays in the scan circuit have a number of positions which correspond to the selection switches. Also each of the relays has a stepping coil (S) and a reset coil (R). Each time the step coil is activated, from the trigger circuit, it advances the pole of the relay one position. The reset coil serves to reset the variable pole of the relay's to the start position at the completion of the scanning cycle, i.e., when each of the positions have been scanned. For example, the step coil of relay SR1, an indicator lamp L4 in the scan circuit is connected in series with the contacts of relay R1 in the trigger circuit and switch S4A of S4, a dual toggle switch in the logic circuit. When R1 is activated from the sensor, it's normally open contacts close completing a circuit with the scan unit allowing current to activate the step coil of relay SR1. When this happens, the variable pole will advance one position. The contacts of R1 then open, the step coil relaxes so the pole remains in the same position until the sensor contacts another strip of sensing tape and the chain of activity is repeated (provided the corresponding selection switch is open). Therefore, as each strip of sensing tape crosses the sensor, the variable pole of stepping relay SR1 and SR2 in the scan unit advances one position to determine if the selection switch is open or closed. If the switch is open the scan will continue but if the switch is closed, the logic unit will be keyed into the circuit and will stop the rapid advancement of the tape while allowing the particular tune at this position on the tape to play. SR2 is a 120 volt DC 21 position stepping relay. It has a stepping coil "S" and a reset coil "R". It selects different rows of switches rather than individual switches like SR1. Relay R7 is used to reset SR1 and SR2 by manually pressing push-button S5. Indicator lamp L5 is also activated.

THE LOGIC CIRCUIT

The logic unit is responsible for automatically operating the STOP, PLAY, FAST FORWARD AND FAST REWIND mechanism of the tape player (which have corresponding solenoids in the present invention) in the desired sequence. See the Logic Circuit in the schematic diagram. For example, when the "START" Push-Button S3 in the logic circuit is pressed, the magnetic tape begins to FAST FORWARD from the beginning. The strips of sensing tape move across the sensor and the trigger circuit is activated. The trigger circuit activates the scan circuit as described previously. As the scan unit arrives at a closed toggle selection switch, the STOP mechanism on the tape player is activated and simultaneously S10, a momentary contact switch is closed which activates relay R4 and charges capacitor C3 in the logic circuit. The 12 volt coil of R4 is connected in parallel with a 250 mf capacitor C3 and in series with switch S10 (which is explained below). R4 is herein referred to as a primary current transfer relay. As the first strip of sensing tape crosses the sensor, if the scan comes to a closed selection switch, the trigger circuit will send a signal through the normally closed (NC) contacts of Relay R4 and activate the Stop solenoid (S) and indicator lamp L1, thus stopping the tape momentarily and closing S10. When S10 closes, Relay R4 is activated, C3 will charge and the normally open (NO) contacts of R4 will close thus relaxing the Stop solenoid which opens the previously closed S10. However, the tape will remain stopped until the PLAY mode is activated. Even though the first strip of sensing has passed the sensor, current still remains in the circuit by virtue of the RC time interval of C1, R1 and R2 in the trigger circuit. When S10 opens, capacitor C3 discharges its current through the coil of R4 keeping it active for about 0.5 seconds. Since the normally open contacts of R4 are now closed, the current will now flow through the No. 1 normally closed contacts of relay R5 and activate the PLAY solenoid and lamp L2.

Referring back to the situation where the selection switch is closed, at the instant the PLAY solenoid is activated, S11 a permanent contact switch and S12 a momentary contact switch are pressed simultaneously therewith. By opening S11, the 1000 mf capacitor C5 now discharges its current over about a 2 second interval through the coil of Relay R6 and its normally closed contacts, previously open, instaneously close. This in turn activates and locks R5 by closing the normally open No. 2 set of contacts of R5. The NO No. 1 set also close. This of course charges the 350 mf capacitor C4. As previously mentioned, capacitor C3 by this time has discharged its current, relaxing R4's contacts back to the N.C. or "STOP" position. Nevertheless, the tape continues to play because C1 has discharged and the strip of sensing tape has moved away from the sensor and there is no remaining current to activate the trigger, scan the selection circuits. R4's functionality as previously explained, centers around responding to the sensing tape which is positioned at the beginning of a selection. The second strip of sensing tape which is positioned at the end of a selection is keyed to relay R5. R5 is herein referred to as the secondary current transfer relay. It serves to transfer current from the second strip of sensing tape to either the "PLAY" solenoid or S4B at S4 on the diagram. Relay R5's 12 volt coil is connected in series with the normally closed contacts of R6, in parallel with capacitor C4 (a 350 mf capacitor) and in series with switches S13 and S14 and with its No. 2 set of NO contacts. When the second strip of sensing tape transmits its current to the logic circuit, an activity transpires similar to that which ensues from the first strip of sensing tape except that R5 is now active and its No. 1 normally open contacts are closed. These contacts now close a circuit to S4B at the S4 position and open the circuit to the PLAY solenoid. Therefore, instead of a "STOP" then "PLAY" a "STOP" then "FAST FORWARD" or "FAST REWIND" sequence will occur, depending upon the position of switch S4, the "FORWARD" "REPEAT" switch. When the "STOP" solenoid is activated this time the "PLAY"

mechanism of the tape player will close S11, activating rather than deactivating relay R6 and charging C5. The already closed contacts of R6 will open, allowing R5 to be reset by S13 and S14 both permanent contact switches automatically. If a repeat of the selection is desired, S4 should be manually switched to the "REPEAT" position which then automatically triggers the "STOP" then "FAST REWIND" then "STOP" and finally "PLAY" solenoids in sequence. This cycle will occur continuously playing the one selection until S4 is switched to the "FORWARD" position. Thus S4 serves to also deactivate the trigger, scan the selection circuits via S4A of S4 so that the scan does not advance from the particular selection switch while the apparatus is in the "REPEAT" position. When S4 is in the "FORWARD" position at the end of a tune, the FF solenoid will engage the FF mechanism of the tape player allowing the scan to run until it comes to a closed selection switch which will trigger the "STOP" then "PLAY" sequence. The resetting by S13 and S14 permit deactivation of "STOP" then FF or FR sequence so that the next strip of sensing tape STOPS then PLAYS, either a repeat of the previous tune or the next tune selected. In otherwords, both switches S13 and S14 opens the circuit deactivating R5 during either the FF or FR mode resetting it back to the PLAY position but because of capacitor C4, relay R5 remains active for about 0.5 seconds allowing enough time for the strip of sensing tape to move away from the sensor without sending any further current or additional signals to the logic circuit.

Note that the apparatus can be entirely operated manually if desired by toggle switch SM. Then Push-buttons S6, S7, S8, and S9 will control the "STOP", "PLAY", "FAST FORWARD" and "FAST REWIND" functions respectively. S3 is a momentary push-button marked "START" which activates the "FAST FORWARD" solenoid which in turn starts the tape.

M2 is a 12 VDC voltmeter which monitors the setting and resetting of R5.

Each solenoid is a 120 VDC solenoid but others may be used if desired.

M1 is a 12 VDC voltmeter which monitors the strength of the signal going to the device. If the signal is weak, the device will function poorly.

S1 is a tripple toggle switch that turns "ON" and "OFF" three separate voltages simultaneously. S1A controls the A.C. line voltage. S1B controls the 120 VDC voltage. S1C controls the 12 VDC voltage.

I claim:

1. A device for automatic program selection from a prerecorded magnetic tape comprising;

a means for sensing and transmitting intermittent electric signals from the magnetic tape;

a means for scanning a matrix of selection switches comprising a first stepping relay having two positions connected per row of switches in order to scan each column of switches per cycle and being capable of stopping once at each position for each electrical signal, and a second stepping relay having one position connected per column of switches in order to scan each row per cycle, and both relays having their automatic resets connected so that the scan operates sequentially scanning a full cycle of the said first relay before resetting to the next position of said second relay, said first stepping relay having a 100 mf capacitor connected across its coil and further connected to a spring actuated switch which is closed by a solenoid connected to the play mechanism of the tape player;

a means for triggering the various modes of the device comprising three spring loaded relays and two capacitors, one of said relays having a 2000 mf capacitor connected therewith and having its normally closed contact connected to the sensor and opening the circuit when current flows through the device while simultaneously closing the second and third relays, the second trigger relay having a 100 mf capacitor connected therewith and its normally open contacts connected to the first stepping relay and the third trigger relay having its switch arm connected to the second stepping relay and having an alternative ground connected to its coil;

a means for automatically controlling the play, stop, fast forward and fast rewind modes comprising a primary transfer relay to transmit the beginning signal of a selection, having its normally closed contact connected in series to a solenoid attached to the stop mechanism of the tape player, its switch arm connected to the normally open contacts of the third trigger relay, and its normally open contacts connected to a secondary transfer relay for transmitting the signal at the end of a selection and the primary transfer relay also having a 250 mf capacitor connected across its coil and said capacitor being connected in parallel to a spring actuated switch which momentarily closes to ground when the stop solenoid is actuated; said secondary relay having two switches, the first of said switches having its normally closed contacts connected directly to a solenoid connected to the play mode of the tape player and said first switch having its normally open contacts connected to a manual double pole double throw switch located between solenoids which are connected to the fast forward and fast rewind mechanisms of a tape player and the switch arm of second trigger relay; the second switch of the secondary relay having its switch arm grounded, its normally closed contact being an open contact and its normally open contact being connected to a 350 mf capacitor which is connected across the coil, said normally closed contact being connected to a last relay, said last relay having a 1000 mf capacitor connected across its coil, a normally open contact which is an open contact and a ground switch arm, said last relay also having its coil connected to a spring actuated switch which is closed when the play solenoid is actuated but is normally open;

further comprising an independent power source, a variable transformer, switches for manually operating each mode and an on-off switch for the device.

* * * * *